United States Patent Office 3,793,303
Patented Feb. 19, 1974

3,793,303
PROCESS FOR THE PRODUCTION OF HOMO- OR COPOLYMERS OF TRIOXANE
Herbert Amann and Gerhard Morlock, Grossauheim, Germany, assignors to Deutsche Gold- und Silber-Scheideanstalt vormals Roessler, Frankfurt am Main, Germany
No Drawing. Filed May 22, 1972, Ser. No. 255,690
Claims priority, application Germany, June 22, 1971, P 21 30 867.8
Int. Cl. C08g 1/04
U.S. Cl. 260—67 FP   8 Claims

ABSTRACT OF THE DISCLOSURE

In a process for the polymerization of trioxane by reacting trioxane in the presence of a cationically active catalyst and a chain-transfer agent, the improvement wherein the chain-transfer agent is a silane of the formula $$R_nSi(OR^1)_{4-n}$$

in which each R is independently selected from hydrogen, a straight chain or branched alkyl or alkenyl radical, a cycloalkyl radical, an aralkyl radical or an aryl radical, each $R^1$ is independently selected from a straight chain or branched alkyl or alkenyl radical, a cycloalkyl radical, an aralkyl radical or an aryl radical, and $n$ is whole number from 0 to 2 inclusive. The polymers re useful in the preparation of plastic goods and articles.

---

This invention relates to the preparation of synthetic resins from aldehydes. More particularly, this invention relates to an improved process for the production of homo- or copolymers of trioxane having a controlled molecular weight and improved resistance to the effects of heat and basic substances.

Like most all synthetic thermoplastic substances, the molecular weights of polyoxymethylenes must generally be adjusted in order that their fusion viscosity will be satisfactory under the conditions of intended use. It is known in the art that the molecular weight of polymers can be controlled during cationic polymerization by the use of a chain-transfer agent in the reaction mass.

Chain-transfer agents useful for controlling the molecular weight of a polymer have been selected from various classes of substances. For example, alcohols, carboxylic acids, carboxylic acid anhydrides, carboxylic acid esters, carboxylic acid ortho esters, ethers, acetals and alkyl substituted aromatics have been employed as chain-transfer agents. While all of these purely organic substances are known to act as chain-transfer agents in the cationic polymerization of trioxane, they differ considerably in their regulating effects. For example, equimolar quantities of these substances under the same processing conditions do not result in the same decrease of molecular weight of the polymer formed. Furthermore, it is known that the terminal groups of the polymer formed during the reaction are dependent upon the type of chain-transfer agent. Depending upon the chain-transfer agent employed, considerable variation has been found in the resistance of the polymer to the effects of heat and/or basic substances. For example, chain-transfer agents having active hydrogen atoms, such as alcohols or carboxylic acids, improve the resistance to heat and/or basic substances only very little. While substances which impart ester bonds to the polymerizate might possibly lead to a polymer having improved thermal stability, such substances do not generally increase the resistance of the polymer to the effects of bases. Most of the substances previously mentioned also influence the polymerization reaction by decreasing the degree of conversion or the rate of polymerization if all other conditions are maintained constant.

It is also known in the art that certain organic boron compounds, namely, boric acid esters of the general formula $B_1OR)_3$, are active chain transfer agents during the cationic polymerization of trioxane (see German Pat. 1,220,607). In the foregoing general formula, R is an alkyl, cycloalkyl or aryl radical. When using these boric acid esters, it is claimed that these substances have practically no influence on the course of the polymerization. It is also claimed that these substances greatly decrease the viscosity of the polymerizates formed, and lead to polymerizates having good stability.

It seems doubtful, however, whether the particularly strong regulating effects of the boric acid ester in polymerization processes are exploitable from a practical point of view. While it is desirable to use substances which will impart stable terminal groups to the polymer chain, the molecular weight must not be decreased to a point where the mechanical characteristics and the processing characteristics of the polymerizate are no longer satisfactory under the conditions of intended use. Such a lower limit of molecular weight will of course be more rapidly reached, the stronger the regulating effect of the chain-transfer agent. Thus, in the homopolymerization of trioxane it is desirable that a chain-transfer agent permit the achievement of improved resistance to the effects of heat and bases, and also the control of molecular weight during polymerization, particularly by avoiding too rapid a decrease in molecular weight during the polymerization reaction.

The same principal applies to the copolymerization of trioxane, particularly if attention is focused not only on the stability of the copolymerizate, but also on its mechanical and processing characteristics. For the reasons mentioned above, it would hardly be expected that the use of a suitable chain-transfer agent without any additional measures would yield copolymers of trioxane with other monomers, which copolymers exhibit good physical and mechanical characteristics and resistance to heat and bases. It is known that some copolymerizates of trioxane, especially copolymerizates with cyclic ethers or acetals, exhibit very good thermal stability. Since these comonomers have very little effect on the regulation of the molecular weight of the copolymerizates during the polymerization reaction, they can be employed in sufficient quantities such that the copolymerizate formed will be almost completely stable to the effects of heat and/or bases. However, incorporation of these comonomers units into a copolymerizate decreases the degree of crystallinity of the copolymerizate, and consequently will lead to a deterioration of essential mechanical characteristics. While efforts have been made to keep the comonomer portion of the polymerizate as small as possible so as to obtain a copolymerizate having properties very similar to the trioxane homopolymerizate, complete stability cannot be assured. Thus, even in this case a suitable chain-transfer agent is desired, which will improve as much as possible the stability of the copolymer to the effects of heat and/or bases.

It is apparent that there has been a need in the art for a process for the polymerization of trioxane, with or without other monomers, which would yield a polymer having a controlled molecular weight, good thermal stability and resistance to basic substances. The polymer formed should also exhibit good mechanical and processing characteristics.

Accordingly, this invention provides an improved process for the polymerization of trioxane. The process comprises reacting trioxane in the presence of a cationically active catalyst and a chain-transfer agent. The chain-transfer agent is an effective amount of a silane of the formula $$R_nSi(OR^1)_{4-n}$$

in which each R is independently selected from hydrogen, a straight chain or branched alkyl or alkenyl radical, a cycloalkyl radical, an aralkyl radical or an aryl radical. Each $R^1$ is independently selected from a straight chain or branched alkyl or alkenyl radical, a cycloalkyl radical, an aralkyl radical or an aryl radical. In the above formula, $n$ is a whole number from 0 to 2 inclusive. It will be understood that mixtures of these silanes can also be used. The improved process of this invention can also be used to prepare copolymers of trioxane with other monomers.

The silanes used in the process of this invention have practically no undesirable side-effects on the polymerization process. Use of these silanes as chain-transfer agents permits the control of the molecular weight of the polymerizate formed in a wide range. Unexpectedly, in polymerizates of comparable molecular weights the proportion of stable terminal groups is larger if the polymerizates are prepared with these silanes instead of the corresponding boric acid esters. This is indeed surprising when $n$ is zero in the above general formula, since it would be expected that such silanes (i.e. the orthosilicic acid esters) would behave like the closely related boric acid esters. Using equimolecular quantities of each, one should expect that the orthosilicic acid esters would have a more pronounced effect on the molecular weight of the polymers because of the ⅓ higher content of alcohol radicals as compared to boric acid esters. This, however, would necessitate a reduction in the amount of the orthosilicic acid ester used to avoid too sharp a decrease in molecular weight; this in turn would result in a smaller proportion of stable terminal groups in the polymerizate formed.

It has been found that the silanes used in the process of this invention differ from the known boric acid esters in their ability to regulate the molecular weight of a polymer. For example, the regulating effects of the silane differ depending upon the alcohol radicals in the general formula previously mentioned; thus, the silane can readily be adapted to the specific requirements. It is known that equimolar quantities of boric acid trimethyl ester and boric acid tri-n-butyl ester exhibit about the same molecular weight regulating effect, and lead to polymerizates having approximately the same degree of stability to heat or bases. On the other hand, the regulating effects of orthosilicic acid tetra-n-butyl ester are considerably less than those exhibited by an equimolar quantity of orthosilicic acid tetramethyl ester. Unexpectedly, however, the stability of the polymerizate formed in the presence of the butyl ester, is considerably better than the polymerizate formed in the presence of the methyl ester.

Quite generaly, it can be stated that the lower members of the silanes used in the process of this invention, particularly those in which $R^1$ is a methyl or ethyl radical, are primarily effective in decreasing the molecular weight of a polymerizate. Silanes in which $n$ is 1 or 2 and R is hydrogen, act in a similar manner. Use of these silanes is, therefore, particularly recommended in cases where a strong molecular weight regulating effect is desired, and an improvement in stability is not absolutely necessary. Thus, these silanes are particularly adapted to the production of copolymers having a relatively high proportion of a comonomer other than trioxane. In most all other instances, the higher representatives of the silanes used in the process of this invention result in the formation of polymers having greater stability to heat or bases. Thus, they are particularly suitable for the production of homopolymers or copolymers having a relatively low comonomer proportion. The use of the higher orthosilicic acid esters has been found to be particularly advantageous in this regard. Esters having alcohol components with at least 4 carbon atoms are particularly preferred in this regard.

The radicals in the aforementioned general formula are independently selected from the specified groups. Thus, the silane can contain 2, 3 or 4 alcohol radicals, which can be the same or different. The number of carbon atoms in the alkoxy radical, is generally about 1–20. Similarly, the number of carbon atoms in the alkenoxy radical is also generally about 1–20. Generally, the cycloalkoxy radicals contain 5 or 6 carbon atoms. The organic radicals bonded directly to the silicone atom are preferably alkyl radicals; alkyl radicals having about 1–4 carbon atoms are particularly preferred. Also preferred are phenyl radicals.

Typical silanes suitable for use in the process of this invention are as follows: Tetramethoxy silane, tetraethoxy silane, tetra-n-propoxy silane, tetraisopropoxy silane, tetra-n-butoxy silane, tetrabutoxy-2-silane, tetra-tert.-butoxy silane, tetraisobutoxy silane, tetrakis-(2-ethylbutoxy) silane, tetra-n-pentyloxy silane, tetrakis-(2,2-ethylbutoxy) silane, tetracyclopentyloxy silane, tetra-n-hexyloxy silane, tetracyclohexyloxy silane, tetrakis-(2-ethylhexyloxy) silane, tetra-n-silane, tetraoctyloxy silane, tetra-n-nonyloxy silane, tetra-n-decyloxy silane, tetra-n-dodecyloxy silane, tetrastearyloxy silane, tetrabenzyloxy silane, dimethoxydiphenoxy silane, methoxytriphenoxy silane, triethoxy silane, triphenoxy silane, tetrakis-(2-methylphenoxy) silane, tetraallyloxy silane, triethoxy silane, triphenoxy silane, diethoxy-n-butyl silane, methyltrimethoxy silane, dimethyldiethoxy silane, propyl-tri-n-butoxy silane, phenyl-tri-n-propoxy silane, and diphenyldiethoxy silane. Other silanes within the aforementioned general formula will be apparent to those skilled in the art.

The concentration of the silane used in the process of this invention depends upon the molecular weight, and thus the fusion viscosity of the resulting polymer. Also, the purity of the trioxane and other reaction ingredients must be taken into account. Since many of the impurities customarily contained in the polymerization mixture act as chain-transfer agents, and at the same time introduce many unstable terminal groups into the polymer, it is preferred that the starting materials be as pure as possible. It is particularly preferred that the starting materials be practically free of water. While a larger quantity of silane may be needed to obtain a particular molecular weight polymer, the stability of the polymer is considerably improved.

It will be apparent that the amount of silane can vary over a wide range. Generally speaking, however, the silanes used in the process of this invention can be used in quantities from about 0.005–5 mole percent, preferably about 0.05–1 mole percent, based on the total number of moles of monomers in the reaction mixture. Other useful amounts can readily be determined with a minimum of experimentation. Similarly, optimum amounts for a given set of reaction conditions can be determined by routine experimentation.

The silanes used according to the process of this invention can be used as regulators of molecular weight quite generally in all known processes for the production of homopolymers or copolymers. Also the polymerization reaction can be carried out as a bulk polymerization or solution polymerization, for example in the presence of inert solvents. By the term "inert solvents" is meant a solvent for the reactants which does not itself enter into the polymerization reaction or materially interfere with the reaction.

All comonomers known to be copolymerizable with trioxane can be used in the process of this invention. Typical comonomers are cyclic esters, for example ethylene glycol carbonate, β-propiolactone, pivalolactone or ε-caprolactone; vinyl compounds, for example styrene or norbornylene. Particularly preferred comonomers are cyclic ethers, for example ethylene oxide and epichlorohydrin, cyclic acetals, for example 1,3-dioxolane, 1,3-dioxane, 1,3-dioxepane and 1,3,5-trioxepane. Also, the trioxane can be polymerized in the presence of primary polymerizates, especially polymeric acetals, such as polydioxolane or polybutanediolformal. Other comonomers will be apparent to those skilled in the art.

Also, all catalysts known for use in the homo- or copolymerization of trioxane can be used in this invention in the customary quantities. Examples of such catalysts are protone acids, such as hyperchloric acid or pyrosulfuric acid, Lewis acids, such as boron trifluoride or tin tetrachloride or their complexes, oxonium and diazonium salts, such as hexafluoroantimonate, hexafluorophosphate, fluoroborate or perchlorate and especially esters and mixed anhydrides of hyperchloric acid, such as methoxymethyl perchlorate, tert. butyl perchlorate and acetyl perchlorate. Other catalysts will be apparent to those skilled in the art.

Also, all other conditions of the known polymerization processes can be used in the process of this invention. For example, the customary polymerization temperatures and reaction times can be used in this invention. Also, the known mixing ratios of monomers can be used in preparing copolymers according to the process of this invention.

Polymers prepared according to the process of this invention can be further processed using conventional techniques. For example, after the polymerization reaction the unreacted catalysts contained in the polymer can be neutralized, and unreacted monomers removed using conventional techniques. Any unstable portions which might be present can be removed in accordance with known thermal or hydrolytic decomposition processes. Prior to final processing, known stabilizers against the effects of oxygen in air and thermal decomposition, as well as fillers, lubricants, pigments and similar additives can optionally be added in the customary quantities. Furthermore, the polymers can be processed according to the methods customarily employed for thermoplastic substances. For example, the polymers can be processed by extrusion or injection molding techniques.

The improved process of this invention will be more readily understood by reference to the following examples. The concentration of the chain-transfer agents is expressed in mole percent based on the total number of moles of monomers present in the reaction mixture. All other figures are expressed as percent by weight based on the weight of trioxane. The catalysts used are added to the reaction mixture in solution form. The tert. butyl perchlorate and nitrosylhexafluoroantimonate are added in a mixture consisting of 97% ethylene chloride and 3% dimethyl glycol. The boron trifluoride-dibutyletherate is added in a solution of pure ethylene chloride. The polymerization time in all instances is about five minutes measured from the addition of the catalysts. After this time, the polymer is quickly cooled and comminuted. Unreacted catalysts is neutralized and unconverted monomers removed by separating the polymer by boiling for one hour with 0.1% aqueous ammonium carbonate solution. The polymer is subsequently washed until free of alkali, and is then dried at 60° C./20 torr. The reduced viscosity which is a measure of the molecular weight of the polymer, is determined in a 0.5% solution in butyrolactone containing 2% diphenylamine at 135° C. Thermal stability is measured by determining the loss in weight of a sample after heating for two hours at 220° C. under a nitrogen atmosphere. Since the individual examples, the purity of the trioxane varies, corresponding comparative figures have been cited in all cases.

EXAMPLES 1 TO 4 AND COMPARATIVE EXAMPLES V1 TO V3

In each example, trioxane is reacted with 0.1 mole percent of various regulators (chain-transfer agents), and is polymerized at 70° C. by addition of $50 \times 10^{-6}\%$ by weight of tert. butyl perchlorate. The results are summarized in Table 1.

TABLE I

| Example number | Regulator | Conversion, percent | $\eta$ Specific/c., dl./g. | Weight loss, percent |
|---|---|---|---|---|
| V1 | None | 85 | 1.18 | 65 |
| V2 | B(OCH$_3$)$_3$ | 78 | 0.30 | 74 |
| V3 | B(OC$_4$H$_9$)$_3$ | 85 | 0.36 | 73 |
| 1 | Si(OCH$_3$)$_4$ | 84 | 0.33 | 56 |
| 2 | Si(OC$_2$H$_5$)$_4$ | 89 | 0.57 | 53 |
| 3 | Si(OC$_4$H$_9$)$_4$ | 91 | 0.85 | 40 |
| 4 | HSi(OC$_2$H$_5$)$_3$ | 79 | 0.34 | 59 |

EXAMPLE 5

Trioxane is reacted with 0.06 mole percent of tetramethoxy silane, and is polymerized at 70° C. by addition of $47 \times 10^{-6}\%$ by weight of tert. butyl perchlorate. A polymer is obtained, the reduced viscosity of which is 0.52. In comparison, a polymer produced without use of tetramethoxy silane, but otherwise under the same conditions, has a reduced viscosity of 1.56.

EXAMPLE 6

Trioxane is reacted with 0.044 mole percent tetraethoxy silane, and is polymerized at 70° C. by addition of $47 \times 10^{-6}\%$ by weight tert. butyl perchlorate. A polymer having a reduced viscosity of 0.66 is obtained. Without addition of tetraethoxy silane, the reduced viscosity is 1.56.

EXAMPLE 7

Trioxane is reacted with 0.055 mole percent triethoxy silane, and is polymerized at 70° C. by addition of $47 \times 10^{-6}$ weight percent tert. butyl perchlorate. The polymer has a reduced viscosity of 0.54. Without addition of triethoxy silane, a polymerizate with a reduced viscosity of 1.56 is obtained.

EXAMPLE 8

Trioxane is reacted with 0.063 mole percent propyl-tri-n-butoxy silane, and is polymerized at 70° C. by addition of $47 \times 10^{-6}$ weight percent tert. butyl perchrolate. The polymer has a reduced viscosity of 0.90. As a comparison, the reduced viscosity of a polymerizate produced in the absence of propyl-tri-n-butoxy silane is 1.56.

EXAMPLE 9

Trioxane is reacted with 0.067 mole percent diphenyl-diethoxy silane, and is polymerized at 70° C. by addition of $54 \times 10^{-6}$ weight percent tert. butyl perchlorate. The polymer has a reduced viscosity of 0.90. The unregulated comparative polymerizate has a reduced viscosity of 1.56.

EXAMPLE 10

Trioxane is polymerized in the presence of 0.6% by weight 1,3-dioxepane and 0.48 mole percent tetra-n-butoxy silane at 70° C. by addition of $40 \times 10^{-6}$ weight percent tert. butyl perchlorate. The copolymer has a reduced viscosity of 0.66. When the polymerization is carried out without tetra-n-butoxy silane, a copolymer having a reduced viscosity of 1.25 is obtained.

EXAMPLE 11

Trioxane is reacted with 0.085 mole percent tetra-n-butoxy silane, and is polymerized at 80° C. by addition of $50 \times 10^{-4}$ weight percent boron trifluoride dibutyletherate. A polymer is obtained, the reduced viscosity of which is 0.65. In comparison, a polymer produced without use of tetra-n-butoxy silane, but otherwise under the same conditions, has a reduced viscosity of 1.07.

EXAMPLE 12

Trioxane is reacted with 0.085 mole percent tetra-n-butoxy silane, and is polymerized at 65° C. by addition of $47 \times 10^{-6}$ weight percent nitrosylhexafluoroantimonate. A polymer with the following characteristics is obtained: 0.89 reduced viscosity and 34% loss of weight in the case of two hours heating under nitrogen. A polymer obtained without the use of tetra-n-butoxy silane has a reduced viscosity of 1.16, and during the two hours heating under nitrogen loses 61% of its weight.

EXAMPLES 13 TO 18 AND COMPARATIVE EXAMPLE V4

Trioxane is reacted with varying quantities of various silanes (regulators) and is polymerized at 70° C. by addition of tert. butyl perchlorate. The results are summarized in Table 2.

TABLE 2

| Example number | Regulator, mole percent | Catalyst, percent by weight | Conversion, percent by weight | $\eta$ Specific/c., dl./g. | Weight loss, percent by weight |
|---|---|---|---|---|---|
| V4 | None | $23 \times 10^{-6}$ | 92 | 1.69 | 91 |
| 13 | 0.1 tetra-n-propoxy silane | $33 \times 10^{-6}$ | 90 | 1.30 | 46 |
| 14 | 0.085 tetra-n-butoxy silane | $33 \times 10^{-6}$ | 87 | 1.62 | 39 |
| 15 | 0.28 tetra-n-butoxy silane | $33 \times 10^{-6}$ | 85 | 1.14 | 27 |
| 16 | 0.48 tetra-n-butoxy silane | $14 \times 10^{-6}$ | 92 | 1.01 | 23 |
| 17 | 0.70 tetra-n-butoxy silane | $23 \times 10^{-6}$ | 90 | 0.82 | 15 |
| 18 | 0.53 tetra-n-hexyloxy silane | $33 \times 10^{-6}$ | 93 | 1.19 | 19 |

When $R^1$ is alkyl in the formula $$R_nSi(OR^1)_{4-n}$$

$C_1$–$C_{20}$ alkyl radicals are preferred, and $C_1$–$C_4$ alkyl radicals are particularly preferred. Similarly, when $R^1$ is alkenyl, $C_1$–$C_{20}$ alkenyl radicals are preferred, and $C_1$–$C_4$ alkenyl radicals particularly preferred. When $R^1$ is cycloalkyl, $C_5$–$C_6$ radicals are preferred. When $R^1$ is an aryl radical, phenyl is preferred, and when $R^1$ is an aralkyl radical, benzyl is preferred.

When R is alkyl in the formula $$R_nSi(OR^1)_{4-n}$$

$C_1$–$C_{20}$ alkyl radicals are preferred, and $C_1$–$C_4$ alkyl radicals are particularly preferred. Similarly, when R is alkenyl, $C_1$–$C_{20}$ alkenyl radicals are preferred, and $C_1$–$C_4$ alkenyl radicals particularly preferred. When R is cycloalkyl, $C_5$–$C_6$ radicals are preferred. When R is an ayl radical, phenyl is preferred, and when R is an aralkyl radical, benzyl is preferred.

Process operating conditions, such as catalyst concentration, reaction time, temperature, pressure, suitable solvents, polymer stabilization techniques, processing equipment, condition of the atmosphere, batch reaction techniques, continuous reaction techniques, etc. will be readily apparent to those skilled in the art. For example, numerous U.S. patents disclose suitable reaction conditions. Among these are 2,475,610, 2,795,571, 2,989,506, 2,989,507, 2,989,508, 2,989,509, 2,989,510, 2,989,511, 3,027,352, 3,071,564, 3,072,609, 3,093,617, 3,115,480, 3,122,525, 3,144,431, 3,168,495, 3,197,437, 3,197,438, 3,200,096.

What is claimed is:

1. In a process for the polymerization of trioxane to a moldable polymer by reacting trioxane in the presence of a cationically active catalyst and a chain-transfer agent, the improvement wherein the process is carried out in the presence of a silane chain-transfer agent in an amount of about 0.005–5 mole percent, based on the total number of moles of monomers, said silane of the formula $$R_nSi(OR^1)_{4-n}$$

in which each R is independently selected from hydrogen, a $C_1$–$C_{20}$ straight chain or branched alkyl radical or a $C_1$–$C_{20}$ alkenyl radical, a $C_5$–$C_6$ cycloalkyl radical, an aralkyl radical or an aryl radical, each $R^1$ is independently selected from a $C_1$–$C_{20}$ straight chain or branched alkyl radical or a $C_1$–$C_{20}$ alkenyl radical, a $C_5$–$C_6$ cycloalkyl radical, an aralkyl radical or an aryl radical, and $n$ is a whole number from 0 to 2 inclusive.

2. The process of claim 1 in which trioxane is copolymerized with a different monomer copolymerizable with trioxane.

3. The process of claim 1 in which the $R^1$ radicals are independently selected from $C_1$–$C_{20}$ alkyl radicals, $C_1$–$C_{20}$ alkenyl radicals, $C_5$–$C_6$ cycloalkyl radicals, benzyl radicals and phenyl radicals.

4. The process of claim 3 in which the R radicals are independently selected from $C_1$–$C_4$ alkyl radicals, hydrogen, benzyl radicals and phenyl radicals.

5. The process of claim 2 in which the $R^1$ radicals are independently selected from $C_1$–$C_{20}$ alkyl radicals, $C_1$–$C_{20}$ alkenyl radicals, $C_5$–$C_6$ cycloalkyl radicals, benzyl radicals and phenyl radicals.

6. The process of claim 5 in which the R radicals are independently selected from $C_1$–$C_4$ alkyl radicals, hydrogen, benzyl radicals and phenyl radicals.

7. The process of claim 4 in which the silane is about 0.05–1 mole percent based on the total number of moles of trioxane.

8. The process of claim 6 in which the silane is about 0.05–1 mole percent based on the total number of moles of monomers.

References Cited

UNITED STATES PATENTS

| 3,297,645 | 1/1967 | Miller | 260—67 FP |
| 3,383,335 | 5/1968 | Kucera et al. | 260—67 FP |
| 3,385,826 | 5/1968 | Hermann et al. | 260—67 FP |
| 3,557,058 | 1/1971 | Fiore et al. | 260—67 FP |

WILLIAM H. SHORT, Primary Examiner

L. M. PHYNES, Assistant Examiner

U.S. Cl. X.R.

260—73 R, 823